Nov. 11, 1952
H. PROVOST
2,617,347
FORWARDLY MOUNTED TRACTOR SOD CUTTER
Filed April 6, 1949
3 Sheets-Sheet 1
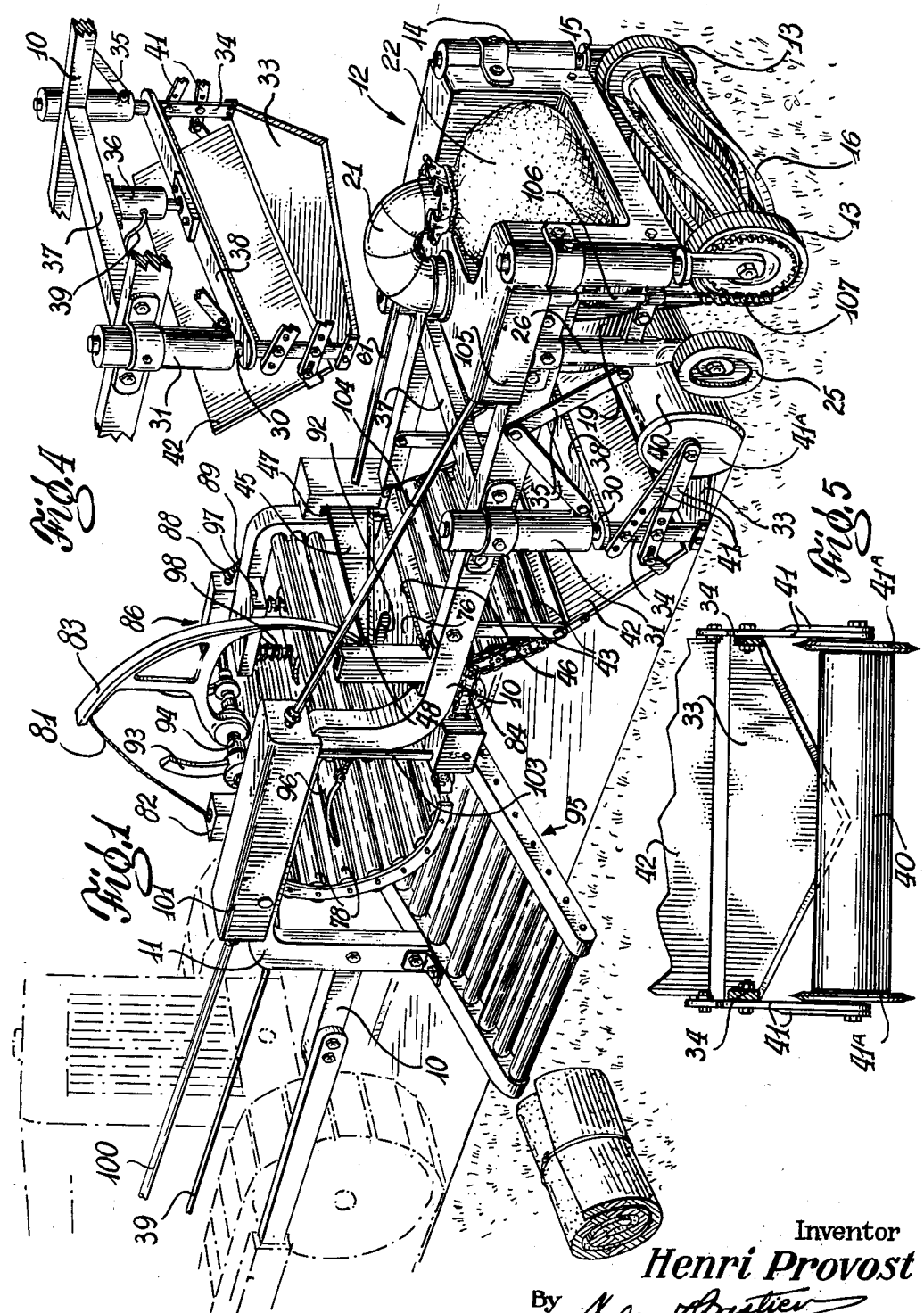
Inventor
Henri Provost
By
Attorneys

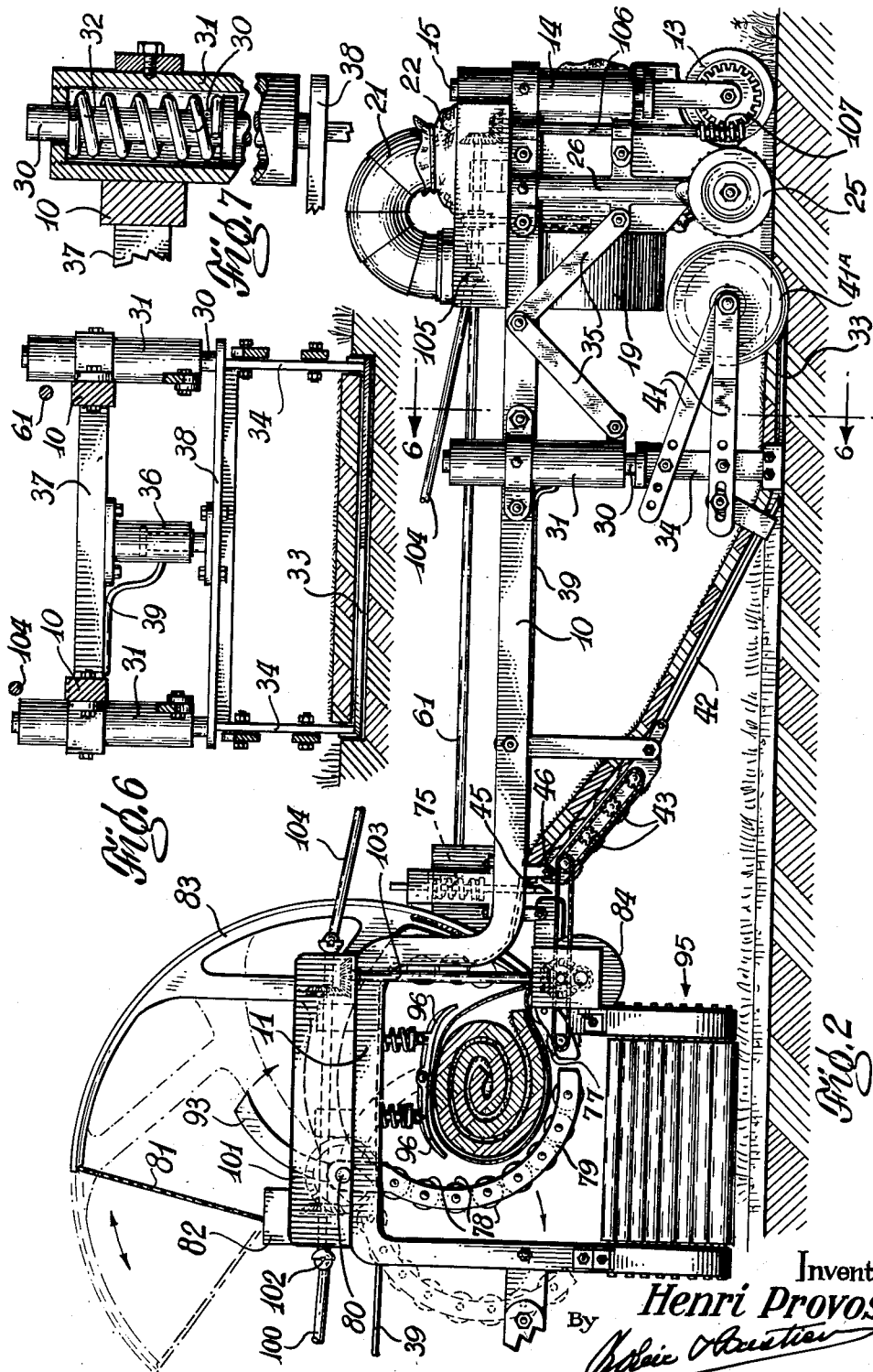

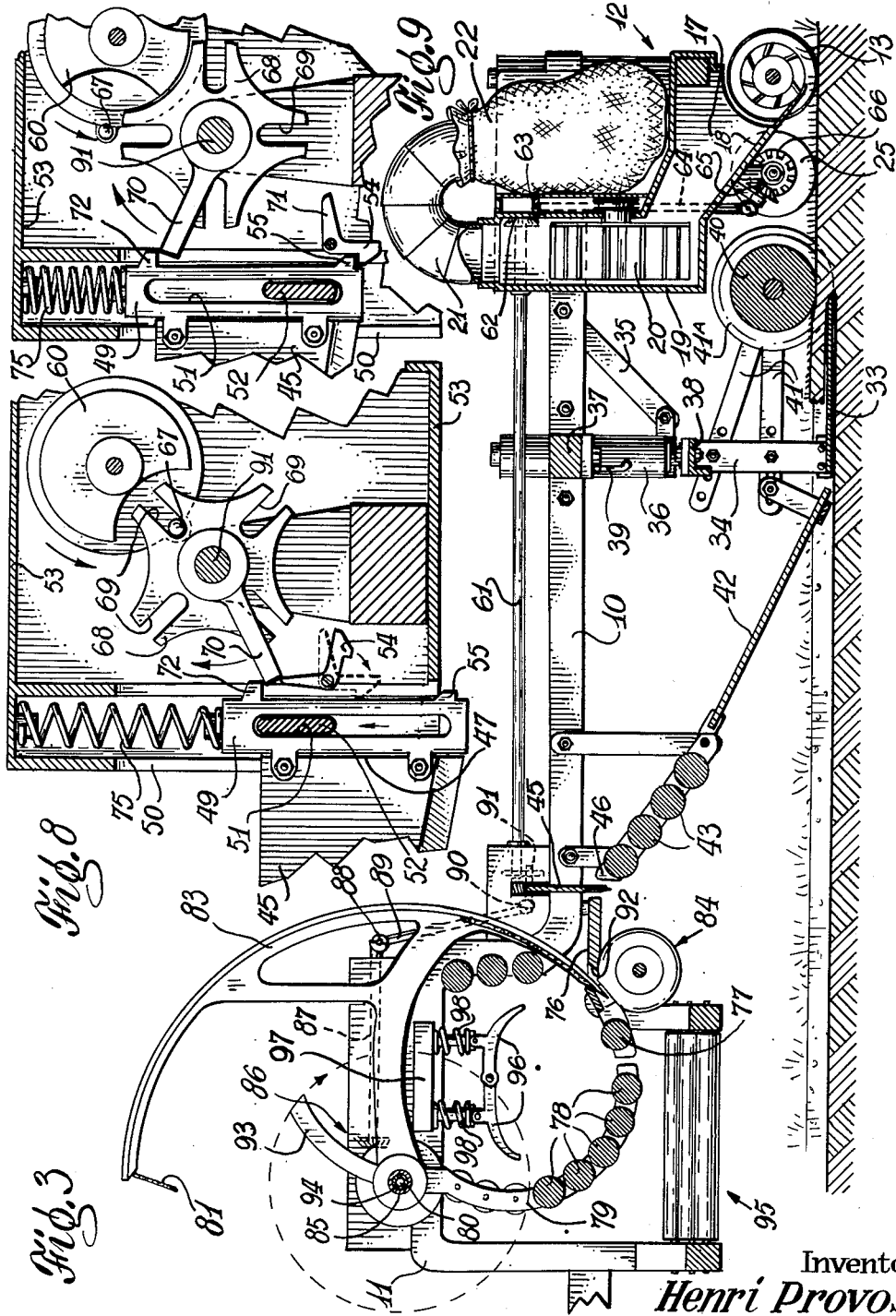

Patented Nov. 11, 1952

2,617,347

UNITED STATES PATENT OFFICE 2,617,347

FORWARDLY MOUNTED TRACTOR SOD CUTTER

Henri Provost, Montreal, Quebec, Canada

Application April 6, 1949, Serial No. 85,790

1 Claim. (Cl. 97—226)

The present invention relates to a machine for cutting and binding sod.

More specifically, this invention concerns a machine affixable to the front or rear of a tractor (or other vehicle) which is adapted to run along the ground, mow the sod, undercut a strip of sod of predetermined width, and bind predetermined lengths of such cut sod into rolls. The invention resides generally in the improved mechanisms for cutting and binding the sod, and in the combination, co-operation and arrangement thereof.

The main object of the invention is to provide a machine of the character described which is practical and with which rolls of sod strips may be cut and bound with little labor and relatively inexpensively.

Another important object resides in the provision of a machine of this nature having improved means for stripping (or cutting strips of) sod, and improved means for automatically cutting such strips into predetermined lengths and binding same into rolls.

Still another object is to provide a machine such as set forth above which includes means for mowing the sod prior to stripping and disposing of the sod or grass clippings so produced.

And another object resides in the provision of a machine of this character which is adapted to perform its functions largely automatically, and which may be adjusted according to the dimensions of the bound units of sod it is desired to produce.

Other objects and advantages will become apparent, or be further pointed out, in the description to follow.

As an example, and for purposes of illustration only, a preferred embodiment of the invention is shown in the annexed drawings, wherein:

Figure 1 shows a perspective view of a complete machine operatively mounted in front of a tractor;

Figure 2 shows a side elevation view longitudinally of the machine;

Figure 3 shows a view in elevation parallel to Fig. 2 but with the machine illustrated partly in section;

Figure 4 shows a perspective view of the sod-undercutting components of the machine;

Figure 5 shows in plan view, with the upper portion of the sod-undercutter removed, the lateral strip cutter and indicates how same is arranged relative to the undercutter;

Figure 6 shows a section along line 6—6 of Fig. 2;

Figure 7 shows a section through the means cushioning the connection between sod-undercutter and the frame;

Figure 8 shows a section through the transverse-cutter control and gear box and indicates how this mechanism operates to control the cutter which separates the sod strip into finite lengths, and Figure 9 is a view similar to Figure 8 indicating a different stage in the operation of this mechanism.

Referring now to the drawings, wherein the same reference characters indicate corresponding parts throughout, the machine is seen in Fig. 1 to be mounted so as to run along the ground in front of a tractor or other vehicle.

The machine has a longitudinal frame including lateral bars 10 which are carried and supported at one end by the propelling vehicle and extend forwardly thereof, being humped or arched intermediate the ends as at 11 to form a frame for the sod binder.

At the front ends of bars 10, a grass or sod mowing unit 12 is secured thereto and runs on the ground as by wheels 13. Between the wheels and bars 10 are inserted cushioning support means, preferably cylinder 14 and spring-controlled piston 15, the latter extending down and being secured at the wheel axes. Between wheels 13 is mounted a mower 16 which may be of conventional type with whirling blades, and behind this unit is mounted (as shown in section, Fig. 3) a casing-enclosed chamber 17 into which are directed the cuttings thrown back by the mower. Casing 18 of the chamber is shaped so that the grass and leaves so directed pass into the bottom orifice or portal of a cylindrical drum 19 in which rotates an impeller 20. The drum axis is longitudinal of the machine frame, and a bent-over chimney 21 runs from an orifice at the drum top to a point forward thereof, a bag 22 being tied around this end of the chimney. Into this bag are thrown the grass cuttings, etc., which may then be disposed of as deemed fitting.

Supplementary frame-supporting wheels 25 are positioned laterally of the machine just behind the mower and are rotatably supported at a fixed distance below bars 10 by rigid legs 26.

Behind the mower and support wheels 25 is located the sod stripper, including means for undercutting the sod and cutting the lateral borders of the strip. The former of these is supported yieldingly below frame bars 10 as by means of pistons 30 slidable in cylinders 31 under the control of coiled spring 32, the latter urging the piston downward. Each cylinder is secured rigidly to a bar 10 in upright position, the lower end of piston 30 extending therefrom and carrying the sod-undercutter blade 33 at the bottom of co-extensive legs 34. The cylinder, as well as legs 26 supporting wheels 25, may be further held upright relative to bars 10 by means of diagonal bracing such as indicated at 35.

The undercutting blade 33 is supported to lie in a horizontal plane at a distance below the ground level. The blade is triangular and moves with its vertex forward for easier cutting. Moreover, means may be provided for positively determining the distance below ground level at which the blade lies, for example, a hydraulic (cylinder and piston) unit 36 mounted between a crossbar 37 rigidly connecting bars 10 and a crossbar 38 rigidly connecting piston legs 34. The said unit may be controlled from the propelling vehicle through an hydraulic pressure line 39 to urge the pistons (and hence blade 33) more or less downwardly relative to the machine frame.

The cutter for the lateral edges of the strip may comprise, as is well known in the art, a roller 40 journalled transverse the machine forward of piston legs 34 and having at each end a circular cutter or colter 41A of greated diameter. The roller rides on the ground whilst colters 41A penetrate to a depth approximately that of the undercutter and cut free the lateral edges of the sod strip. The said lateral cutting means may be journalled between the forwardly-extending arms 41 on each piston leg 34.

A flat plate 42 is supported in inclined position behind the sod stripping means and the sod is directed up the surface of same as the machine moves forward. From the upper edge of plate 42, the sod strip moves onto the positively-actuated, transverse roller bars 43 of a conveyor, and is carried past the transverse cutter into the sod binder.

The transverse cutter and its associated mechanism is best shown in Figs. 1, 3, 8 and 9. The cutter blade 45 is preferably triangular in shape with the lower cutting edge slanting in a vertical plane across and above the upper end 46 of the sod conveyor. The blade is supported upright and transverse the machine, with its wide end 47 and narrow end 48 each secured to an upright bar 49 slidably lodged in a vertically elongated frame 50. Bars 49 may have slots 51 therethrough which slidably enclose a fixed guide bar 52 adapted to further stabilize and to limit the vertical motion of each end of blade 45.

At one end of the blade, preferably the wide end, a mechanism for controlling cutter movement is enclosed in casing 53 adjacent frame 50. To hold the blade releasably in an upright position, a dog 54 may be pivoted to casing 53 in position to engage a projecting lug 55 near the lower end of bar 49. The mechanism may include a Geneva-cross cam 68, and drive assembly therefor, such as is illustrated in Figs. 8 and 9. The drive wheel 60 will be rotated at a speed proportional to the forward speed of the sod cutter (driven, say, by shaft 61 actuated from one wheel 25 through gears 62 and 63, upright shaft 64, and gears 65 and 66) and carries the usual pin 67 on its circumference adapted to engage slots 69 on the cross cam to rotate same an amount equal to one cam segment. A cross having four segments is shown, although drives and cams may be similarly arranged for different degrees of displacement, hence the cross will only revolve once for each four revolutions of shaft 61. A projecting arm 70 on the cross will displace dog 54 outward as it comes past the latter by pushing up tail 71 of the dog. This will allow blade 45 to fall and hence cut the sod strip transversely. As such cutting is completed, the free end of arm 70 catches a further lug 72 projecting from near the top of bar 49 and raises the latter and blade 45 upward, the blade being fully raised as the cross completes its quarter-circle positive displacement. Dog 54 again falls in place to keep the blade held up as the cross moves on around for another cycle of operation.

Springs 75 may be provided compressed in the upper portions of frames 50 if desired to urge the blade downward with greater than gravitational force.

As the sod passes over the upper end of the conveyor below blade 45, it moves over the narrow platform 76 and into the binder frame. A positively-actuated roller rail 77 urges onward the sod as it descends from the platform, and pushes the leading end of same against the rotatably-mounted transverse rails 78 which are journalled between arcuately-curved packing arms 79. (Figs. 1, 2 and 3). The latter are pivoted freely, at their upper ends, on a shaft 80 extending transverse the apparatus. The packing arms and rail are arranged to move to a position approaching the platform (full outline, Fig. 2) by virtue of their weight, and hence cause the onwardly moving strip of sod to be rolled up into a bundle in the binder, a cord 81 forming a loop around said bundle in conventional manner. The cord 81 emanates from a spool in box 82 on top of the binder, and passes through the arcuate reciprocating needle-arm 83 down to a conventional cord-holding and knotting mechanism 84. The needle arm is mounted on a sleeve 85 rotating on shaft 80 under the control of a gear mechanism generally indicated at 86, which is in turn driven in synchronism with Geneva-cross cam 68 through shaft 87, joint 88, shaft 89, joint 90 and shaft 91.

In the movement of cross 68 subsequent to the lifting of the blade, and as the severed rear end of the bound strip passes beyond platform 76, needle arm 83 pivots down so that the needle thereof enters the knotter and cord-holding mechanism through slot 92 in platform 76. The cord mechanism then cuts the cord, knots the loop around the bound sod and grips the new cord end projecting from the needle arm. The latter is then raised upward as a new length of sod moves from the conveyor over platform 76.

As the bundle of sod is knotted, the releasing arms 93 (mounted on a sleeve 94 positively driven around shaft 80) which pivot continually around shaft 80 descend to push the bundle of sod down and out of the binder against the urging of packing arms 79, the latter swinging to the rear (or to the left, Figs. 2, 3). The bound sod drops to the laterally projecting roller rail 95 and drops from thence to the ground.

To aid in rolling the sod in a tight bundle, pivoted arcuately-curved packing plates 96 may be supported from inwardly-projecting blocks 97 on the binder frame, and urged downwardly therefrom by springs 98 as shown in Figs. 1, 2 and 3.

The positive drive for the various mechanisms described above may be provided from the propelling vehicle. Thus a shaft 100 may be driven from the vehicle, being coupled to a gear box 101 on the top of the binder through joint 102.

The sleeve 94 may be rotated from a drive in this gear box, and a shaft 103 extending downward therefrom may deliver power to the conveyor rails 43 and 77 (through suitable gearing, sprockets and chains as illustrated in Fig. 2) and also to the conventional cord knotting and handling mechanism. A shaft 104 coupled between gear box 101 and another gear box 105 on top of the mower unit may deliver power to the latter. From here, a belt drive may rotate the mower impeller, whilst further gearing cuts upright shaft 106 acting through worm 107 and pinion 108 may permit positive rotation of the whirling mower blades (Fig. 2).

Obviously, from the foregoing, the present invention fulfills the objectives hereinbefore set forth. There has been described a practical, improved apparatus for cutting and handling strips of sod, one which is capable of producing large numbers of rolled and bound strips of sod in a comparatively short time and with little effort. The device comprises improvements in the individual sod stripping and cutting mechanisms, and envisages cutting the sod into strips of predetermined lengths and binding same in a roll. The combination of unitary mechanisms in a comprehensive machine enables the sod to be handled in one operation which has not to my knowledge been possible before.

It will therefore be understood that I do not limit myself to the particular embodiment of my invention herein shown and described, since obviously various alterations might be made therein respecting the size, shape and arrangement of parts, or even as regards the substitution in the combined unit of well-known equivalent unitary mechanisms, without departing from the spirit of the invention as defined in the appended claim.

Having thus described my invention, I claim:

In a sod-handling machine of the character described, a frame adapted to be connected at its rear end to a prime mover and having ground engaging wheels mounted on the forward end thereof, a sod cutting device comprising a pair of vertically extending, spring loaded, extensible legs mounted on said frame, a ground engaging roller adjustably mounted on said legs forwardly thereof, a side colter of greater diameter than the roller mounted concentrically on each end of said roller and adapted to cut parallel side edges of the sod to be lifted, a horizontal, triangular shaped, flat plate undercutter mounted on the lower portion of said legs and positioned substantially underneath the roller, said undercutter adapted to cut the sod below the surface thereof between the already-cut parallel side edges, extensible means connected between said legs and said frame and acting against the spring loaded means of said legs to positively position said legs vertically and hence determine the depth of cut of said undercutter, a vertically movable plate connected between said legs and said frame and extending upwardly and rearwardly from said undercutter, a horizontal platform carried by said frame in rearwardly spaced relation with respect to the upper end of said plate, a guillotine cutter carried by said frame and arranged to operate in the space between said plate and said platform, and mechanical means carried by the frame deriving power from said ground engaging wheels to periodically actuate said guillotine cutter for cutting the lifted sod strips into lengths suitable for transportation.

HENRI PROVOST.

REFERENCES CITED

The following references are of record in the file of this patent:

UNITED STATES PATENTS

| Number | Name | Date |
| --- | --- | --- |
| 45,926 | Kirk | Jan. 17, 1865 |
| 195,048 | Rauch | Sept. 11, 1877 |
| 1,516,561 | Best | Nov. 25, 1924 |
| 1,537,412 | Dafferner | May 12, 1925 |
| 1,732,972 | Knipfing | Oct. 22, 1929 |
| 2,401,653 | Mohler | June 4, 1946 |

FOREIGN PATENTS

| Number | Country | Date |
| --- | --- | --- |
| 693,128 | Germany | July 2, 1940 |